(12) United States Patent
Keller et al.

(10) Patent No.: US 10,354,762 B2
(45) Date of Patent: Jul. 16, 2019

(54) PASSIVE COOLING TO COLD SHUTDOWN

(71) Applicant: NuScale Power, LLC, Corvallis, OR (US)

(72) Inventors: Michael Keller, Corvallis, OR (US); Ross Snuggerud, Corvallis, OR (US); Tamas Liszkai, Corvallis, OR (US)

(73) Assignee: NUSCALE POWER, LLC, Corvallis, OR (US)

( * ) Notice: Subject to any disclaimer, the term of this patent is extended or adjusted under 35 U.S.C. 154(b) by 797 days.

(21) Appl. No.: 14/923,277

(22) Filed: Oct. 26, 2015

(65) Prior Publication Data

US 2017/0117063 A1    Apr. 27, 2017

(51) Int. Cl.
*G21C 15/18* (2006.01)
*G21C 13/02* (2006.01)
(Continued)

(52) U.S. Cl.
CPC ............. *G21C 15/18* (2013.01); *G21C 13/00* (2013.01); *G21C 13/02* (2013.01); *G21C 15/24* (2013.01); *G21C 17/00* (2013.01); *Y02E 30/40* (2013.01)

(58) Field of Classification Search
CPC ........ G21C 15/18; G21C 13/00; G21C 13/02; G21C 15/24; G21C 17/00
(Continued)

(56) References Cited

U.S. PATENT DOCUMENTS

| 558,660 A | 4/1896 | Reissing |
|---|---|---|
| 2,707,967 A | 2/1950 | Adams |

(Continued)

FOREIGN PATENT DOCUMENTS

| CN | 104112482 A | 10/2014 |
|---|---|---|
| GB | 10752AAD1911 | 9/1911 |

(Continued)

OTHER PUBLICATIONS

International Preliminary Report on Patentability for PCT/US2015/060144 dated Aug. 10, 2017; 20 pages.
(Continued)

*Primary Examiner* — Jack W Keith
*Assistant Examiner* — Daniel Wasil
(74) *Attorney, Agent, or Firm* — Schwabe Williamson & Wyatt (57) ABSTRACT

A cooling system for a reactor module includes a reactor pressure vessel that houses primary coolant and a steam generator that lowers a temperature of the reactor pressure vessel by transferring heat from the primary coolant to a secondary coolant. The steam generator releases at least a portion of the secondary coolant as steam. Additionally, the cooling system includes a containment vessel that at least partially surrounds the reactor vessel in a containment region. The containment region is dry during normal operation of the reactor module. A controller introduces a source of water into the containment region in response to a non-emergency shut down of the reactor module. The source of water is located external to the containment vessel, and the water is introduced into the containment region after the steam generator has initially lowered the temperature of the reactor pressure vessel in response to releasing the steam.

12 Claims, 10 Drawing Sheets

(51) Int. Cl.
*G21C 15/24* (2006.01)
*G21C 17/00* (2006.01)
*G21C 13/00* (2006.01)

(58) Field of Classification Search
USPC ........................................................ 376/299
See application file for complete search history.

(56) References Cited

U.S. PATENT DOCUMENTS

| | | | |
|---|---|---|---|
| 2,998,363 A | 5/1955 | Blaser | |
| 3,115,450 A | 12/1963 | Schanz | |
| 3,255,089 A | 6/1966 | Deighton | |
| 3,547,778 A | 12/1970 | Flaherty | |
| 3,865,688 A | 2/1975 | Kleimola | |
| 4,092,490 A | 5/1978 | Schabert et al. | |
| 4,246,069 A | 1/1981 | Dupuy | |
| 4,466,253 A | 8/1984 | Jaster | |
| 4,647,425 A | 3/1987 | Battaglia | |
| 4,668,467 A * | 5/1987 | Miler | G21C 15/18 376/299 |
| 4,753,771 A | 6/1988 | Conway | |
| 5,271,051 A | 12/1993 | Corletti | |
| 5,319,687 A * | 6/1994 | Henry | G21C 15/18 376/299 |
| 5,511,102 A | 4/1996 | Gluntz | |
| 6,243,432 B1 | 6/2001 | Cheung | |
| 6,463,819 B1 | 10/2002 | Rago | |
| 7,558,360 B1 * | 7/2009 | Gamble | G21C 9/016 376/282 |
| 7,669,693 B2 | 3/2010 | Yamaguchi | |
| 8,537,959 B2 | 9/2013 | Akinaga | |
| 9,206,978 B2 | 12/2015 | Evans et al. | |
| 9,881,704 B2 | 1/2018 | Harris | |
| 2003/0048865 A1 | 3/2003 | Cheung | |
| 2004/0017877 A1 | 1/2004 | Hartel | |
| 2007/0076835 A1 | 4/2007 | Tobimatsu | |
| 2007/0121776 A1 | 5/2007 | Pao | |
| 2009/0129530 A1 | 5/2009 | Reyes, Jr. | |
| 2009/0129531 A1 | 5/2009 | Reyes, Jr. | |
| 2009/0161812 A1 * | 6/2009 | Reyes | G21C 15/18 376/283 |
| 2009/0260584 A1 * | 10/2009 | Watakabe | G21D 1/02 122/122 |
| 2011/0164713 A1 * | 7/2011 | Ahlfeld | G21C 15/06 376/213 |
| 2013/0259183 A1 | 10/2013 | Sato | |
| 2013/0336440 A1 | 12/2013 | Memmott | |
| 2014/0205051 A1 | 7/2014 | Harkness | |
| 2016/0217875 A1 | 7/2016 | Harris | |

FOREIGN PATENT DOCUMENTS

| | | |
|---|---|---|
| JP | S63 165798 A | 7/1988 |
| WO | 2010/150285 A2 | 12/2010 |
| WO | 2016/122743 A1 | 8/2016 |
| WO | 2017074507 A1 | 5/2017 |

OTHER PUBLICATIONS

International Preliminary Report on Patentability for PCT/US2016/030013 dated May 11, 2018; 9 pages.

International Search Report and Written Opinion for PCT/US2015/060144 dated Jun. 23, 2016; 20 pages.

International Search Report and Written Opinion for PCT/US2016/030013 dated Oct. 18, 2016; 20 pages.

* cited by examiner

PASSIVE COOLING TO COLD SHUTDOWN

GOVERNMENT INTEREST

This invention was made with Government support under Contract No. DE-NE0000633 awarded by the Department of Energy. The Government has certain rights in this invention.

BACKGROUND

When conventional pressurized water reactors (PWR) are being shutdown, they are typically cooled by releasing steam from steam generators to decrease the operating temperature to about 250° F. Because further cool down using steam cooling becomes substantially ineffective around 250° F., continued cool down to a cold shutdown status (with operating temperatures less that 200° F.) is typically accomplished with an additional shutdown cooling system.

In conventional cooling systems a forced cooling system may be placed in service to lower the temperature of the primary coolant below 200° F. These shutdown cooling systems are typically dual purpose systems that require pumps to operate. The normal purpose of such systems is to transfer heat from the shutdown reactor to a water reservoir or heat sink via a heat exchanger. The alternate purpose of such systems is to inject large volumes of low pressure water following a reactor accident.

Because of the dual purpose of such cooling system, one of which is related to reactor safety, shutdown cooling systems typically require extensive maintenance and testing to ensure they are ready to perform their active safety function. In addition, the systems may be reliant on the continuous functioning of pumps, heat exchangers, piping, and one or more electrical sources to power the system, including redundancies.

Further, for other types of reactor modules that are designed to be moved during one or more operations, it may be necessary to first disconnect the pumps and/or electrical connections before moving the reactor module.

This application addresses these and other problems.

SUMMARY

A cooling system for a reactor module is disclosed herein. The cooling system may comprise a reactor pressure vessel housing primary coolant, and a steam generator configured to lower a temperature of the reactor pressure vessel by transferring heat from the primary coolant to a secondary coolant that circulates through the steam generator. A containment vessel at least partially surrounds the reactor vessel in a containment region. The containment region may be dry and/or at least partially evacuated during normal operation of the reactor module. Additionally, the cooling system may comprise a controller configured to introduce a source of water into the containment region in response to a non-emergency shut down of the reactor module. The source of water may be located external to the containment vessel, and the water is may be introduced into the containment region after the steam generator has initially lowered the temperature of the reactor pressure vessel by releasing the secondary coolant as steam.

A method for cooling a reactor module is disclosed herein. The method may comprise initiating a non-emergency reactor shutdown operation and controllably releasing steam from a steam generator to reduce the temperature associated with a reactor pressure vessel in response to initiating the non-emergency reactor shut down operation. The steam may be generated from a transfer of heat from primary coolant contained within the reactor pressure vessel to secondary coolant that circulates through the steam generator until at least a portion of the secondary coolant reaches a boiling temperature. The method may further comprise cooling down the reactor pressure vessel to a threshold cool-down temperature in response to releasing steam from the steam generator, and at least partially flooding a containment region located between the reactor pressure vessel and a surrounding containment vessel. The containment region may be flooded from an external fluid source until a majority of the reactor pressure vessel is surrounded by fluid. Additionally, the reactor pressure vessel may be cooled down from the threshold cool-down temperature to a shutdown temperature associated with a cold shutdown state of the reactor module in response to partially flooding the containment region. The shutdown temperature may be less than the boiling temperature of the secondary coolant.

A system for cooling a reactor module is disclosed herein. The system may comprise means for controllably releasing steam to reduce a temperature associated with a reactor pressure vessel in response to a non-emergency shut down operation. The steam may be generated from a transfer of heat from primary coolant contained within the reactor pressure vessel to a secondary cooling system until the secondary coolant reaches a boiling temperature, and the reactor pressure vessel may be cooled down to a threshold cool-down temperature in response to releasing the steam from the steam generator. The system may further comprise means for at least partially flooding a containment region located between the reactor pressure vessel and a surrounding containment vessel. The containment region may be flooded from an external fluid source until a majority of the reactor pressure vessel is surrounded by fluid, and the reactor pressure vessel may additionally be cooled down from the threshold cool-down temperature to a a shutdown temperature in response to partially flooding the containment region. The shutdown temperature may be less than the boiling temperature of the secondary coolant.

DETAILED DESCRIPTION

Various examples disclosed and/or referred to herein may be operated consistent with, or in conjunction with, one or more features found in U.S. Pat. No. 8,588,360, entitled Evacuated Containment Vessel for a Nuclear Reactor, U.S. Pat. No. 8,687,759, entitled Internal Dry Containment Vessel for a Nuclear Reactor, and U.S. patent application Ser. No. 14/607,968, entitled Containment Vessel Drain System, the contents of which are incorporated by reference herein.

Figure 1:
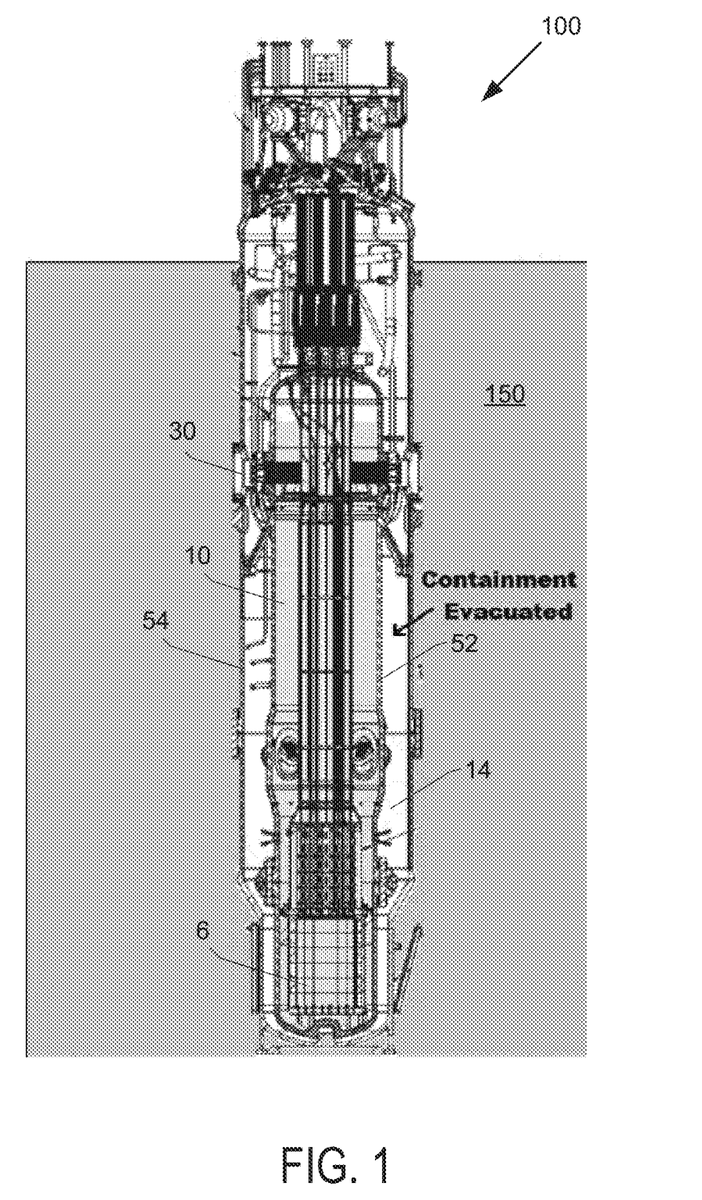
FIG. 1 illustrates an example nuclear reactor module with a dry and/or evacuated containment region.

FIG. 1 illustrates an example nuclear reactor module 100 with a dry and/or evacuated containment region 14. The nuclear reactor module 100 may comprise a reactor core 6 surrounded by a reactor pressure vessel 52. Primary coolant 10 in the reactor pressure vessel 52 surrounds the reactor core 6.

Reactor pressure vessel 52 may be surrounded by a containment vessel 54. In some examples, containment vessel 54 may be located in a reactor pool 150. The reactor pool 150 may contain borated water stored below ground level. Containment vessel 54 may be at least partially submerged in the reactor pool 150. Additionally, containment vessel 54 may be configured to prohibit the release of any primary coolant 10 associated with reactor pressure vessel 52 to escape outside of containment vessel 54 into the reactor pool 150 and/or into the surrounding environment.

Containment vessel 54 may be approximately cylindrical in shape. In some examples, containment vessel 54 may have one or more ellipsoidal, domed, or spherical ends, forming a capsule shaped containment. Containment vessel 54 may be welded or otherwise sealed to the environment, such that liquids and/or gases are not allowed to escape from, or enter into, containment vessel 54 during normal operation of reactor module 100. In various examples, reactor pressure vessel 52 and/or containment vessel 54 may be bottom supported, top supported, supported about its center, or any combination thereof.

In some examples and/or modes of operation, an inner surface of reactor pressure vessel 52 may be exposed to a wet environment comprising the primary coolant 10 and/or vapor, and an outer surface of reactor pressure vessel 52 may be exposed to a substantially dry environment. The reactor pressure vessel 52 may comprise and/or be made of stainless steel, carbon steel, other types of materials or composites, or any combination thereof.

The containment region formed within containment vessel 54 may substantially surround the reactor pressure vessel 52. Containment region 14 may comprise a dry, voided, evacuated, and/or gaseous environment in some examples and/or modes of operation. Containment region 14 may comprise an amount of air, a Nobel gas such as Argon, other types of gases, or any combination thereof. Additionally, the surfaces of one or both of reactor pressure vessel 52 and containment vessel 54 that bound containment region 14 may be exposed to water during certain modes of operation such as refueling, shutdown, or transport within the reactor pool 150.

Containment region 14 may be maintained at or below atmospheric pressure, including a partial vacuum of approximately 300 mmHG absolute (5.8 psia) or less. In some examples, containment region 14 may be maintained at approximately 50 mmHG absolute (1 psia). In still other examples, containment region 14 may be maintained at a substantially complete vacuum. Any gas or gasses in containment vessel 54 may be evacuated and/or removed prior to operation of reactor module 100. During normal operation of reactor module 100, containment region 14 may be kept dry and/or evacuated of any water or liquid. Similarly, containment region 14 may be kept at least partially evacuated of any air or gases.

A heat exchanger may be configured to circulate feedwater and/or steam in a secondary cooling system in order to generate electricity. In some examples, the feedwater passes through the heat exchanger and may become super-heated steam. The feedwater and/or steam in the secondary cooling system are kept isolated from the primary coolant 10 in the reactor pressure vessel 52, such that they are not allowed to mix or come into direct (e.g., fluid) contact with each other.

The heat exchanger and/or associated piping of the secondary cooling system may be configured to penetrate through reactor pressure vessel 52 at one or more plenum 30. Additionally, the secondary piping may be routed to the upper region of containment above the level of the reactor pool 150, where the piping penetrates through containment vessel 54. By exiting containment above the reactor pool 150, the high temperature steam and feedwater lines do not loose heat to the reactor pool water 150.

Figure 2:
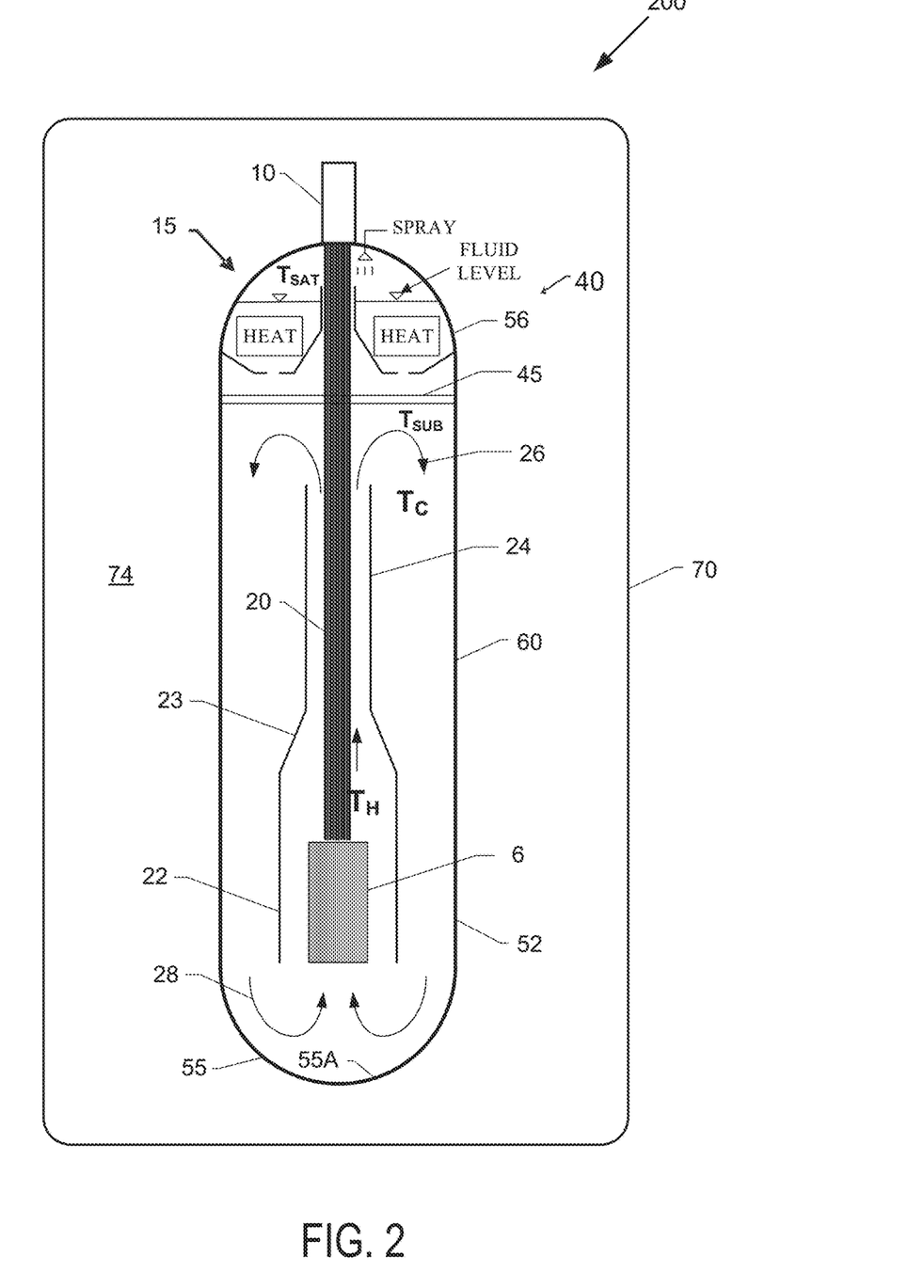
FIG. 2 illustrates a cross-sectional view of an example reactor module.

FIG. 2 illustrates a cross-sectional view of an example reactor module 200 comprising reactor pressure vessel 52. Reactor core 6 is shown located near a lower head 55 of the reactor pressure vessel 52. The reactor core 6 may be located in a shroud 22 which surrounds reactor core 6 about its sides. A riser section 24 is located above the reactor core 6.

When primary coolant 10 is heated by reactor core 6 as a result of fission events, primary coolant 10 may be directed from shroud 22 up into an annulus 23 located above reactor core 6, and out of riser 24. This may result in additional primary coolant 10 being drawn into shroud 22 to be heated in turn by reactor core 6, which draws yet more primary coolant 10 into shroud 22. The primary coolant 10 that emerges from riser 24 may be cooled down and directed towards the outside of the reactor pressure vessel 52 and then returned to the bottom of the reactor pressure vessel 52 through natural circulation.

Primary coolant circulates past the reactor core 6 to become high-temperature coolant TH and then continues up through the riser section 24 where it is directed back down the annulus and cooled off by a heat exchanger to become low-temperature coolant TC. One or more control rod drive mechanisms (CRDM) 10 operably coupled to a number of drive shafts 20 may be configured to interface with a plurality of control rod drive assemblies located in reactor core 6.

A reactor pressure vessel baffle plate 45 may be configured to direct the primary coolant (shown as coolant flow 26) towards a lower end 55 of the reactor pressure vessel 52. A surface of the reactor pressure vessel baffle plate 45 may come into direct contact with and deflect the primary coolant that exits the riser section 24. In some examples, the reactor pressure vessel baffle plate 45 may be made of stainless steel or other materials.

The lower end 55 of the reactor pressure vessel 52 may comprise an ellipsoidal, domed, concave, or hemispherical portion 55A, wherein the ellipsoidal portion 55A directs the primary coolant (shown as coolant flow 28) towards the reactor core 6. The ellipsoidal portion 55A may increase flow rate and promote natural circulation of the primary coolant through the reactor core 6. Further optimization of the coolant flow 26 may be obtained by modifying a radius of curvature of the reactor pressure vessel baffle plate 45 to eliminate/minimize boundary layer separation and stagnation regions.

The reactor pressure vessel baffle plate 45 is illustrated as being located between the top of the riser section 24 and a pressurizer region 15. The pressurizer region 15 is shown as comprising one or more heaters and a spray nozzle configured to control a pressure, or maintain a steam dome, within an upper end 56 or head of the reactor pressure vessel 52. Primary coolant located below the reactor pressure vessel baffle plate 45 may comprise relatively sub-cooled coolant TSUB, whereas primary coolant in the pressurizer region 15 in the upper end 56 of the reactor pressure vessel 52 may comprise substantially saturated coolant TSAT.

A fluid level of the primary coolant is shown as being above the reactor pressure vessel baffle plate 45, and within the pressurizer region 15, such that the entire volume between the reactor pressure vessel baffle plate 45 and the lower end 55 of the reactor pressure vessel 52 may be full of primary coolant during normal operation of the reactor module 200.

Shroud 22 may support one or more control rod guide tubes or instrumentation structures. The one or more control rod guide tubes or instrumentation structures may be attached to the riser section 24, and serve to guide control rod assemblies that are inserted into, or removed from, the reactor core 6, or provide support for instrumentation devices located inside the reactor pressure vessel 52. In some examples, control rod drive shafts may pass through reactor pressure vessel baffle plate 45 and through riser section 24 in order to control the position of the control rod assemblies relative to reactor core 6.

Reactor pressure vessel 52 may comprise a flange by which lower head 55 may be removably attached to a vessel body 60 of reactor pressure vessel 52. In some examples, when the lower head 55 is separated from vessel body 60, such as during a refueling operation, riser section 24, baffle plate 45, and other internals may be retained within vessel body 60, whereas reactor core 6 may be retained within lower head 55.

Additionally, vessel body 60 may be housed within a containment vessel 70. Any air or other gases that reside in a containment region 74 located between containment vessel 70 and reactor pressure vessel 52 may be removed or voided prior to or during reactor startup. The gases that are voided or evacuated from the containment region 74 may comprise non-condensable gases and/or condensable gases. Condensable gases may include steam that is vented into containment region 74.

During an emergency operation, whereas vapor and/or steam may be vented into containment region 74, only a negligible amount of non-condensable gas (such as hydrogen) may be vented or released into containment region 74.

Certain gases may be considered non-condensable under operating pressures that are experienced within a nuclear reactor system. These non-condensable gases may include hydrogen and oxygen, for example. During an emergency operation, steam may chemically react with the fuel rods to produce a high level of hydrogen. When hydrogen mixes with air or oxygen, this may create a combustible mixture. By removing a substantial portion of the air or oxygen from containment vessel 54, the amount of hydrogen and oxygen that is allowed to mix may be minimized or eliminated.

It may be possible to assume from a practical standpoint, that substantially no non-condensable gases are released into or otherwise housed in containment region 74 during operation of reactor module 200. Accordingly, in some examples, substantially no hydrogen gas is present in the containment region 74, such that the levels and/or amounts of hydrogen together with any oxygen that may exist within the containment region 74 are maintained at a non-combustible level. Additionally, this non-combustible level of oxygen-hydrogen mixture may be maintained without the use of hydrogen recombiners. In some examples, separate vent lines from the reactor pressure vessel 52 may be configured to remove non-condensable gases during start up, heat up, cool down, and/or shut down of the reactor.

Removal of convective heat transfer in air occurs generally at about 50 torr (50 mmHG) of absolute pressure, however a reduction in convective heat transfer may be observed at approximately 300 torr (300 mmHG) of absolute pressure. In some examples, containment region 74 may be provided with, or maintained below, a pressure of 300 torr (300 mmHG). In other examples, containment region 74 may be provided with, or maintained below, a pressure of 50 torr (50 mmHG). In some examples, containment region 74 may be provided with and/or maintained at a pressure level which substantially inhibits all convective and/or conductive heat transfer between reactor pressure vessel 52 and containment vessel 54. A complete or partial vacuum may be provided and/or maintained by operating a vacuum pump, steam-air jet ejector, other types of evacuation devices, or any combination thereof.

By maintaining containment region 74 at a vacuum or partial vacuum, moisture within containment region 74 may be eliminated, thereby protecting electrical and mechanical components from corrosion or failure. The vacuum within the containment region 74 may act as a type of thermal insulation during normal operation of the reactor module, thereby retaining heat and energy in reactor pressure vessel 52 where it can continue to be utilized for power generation. As a result, conventional thermal insulation is not required in the design of reactor pressure vessel 52.

Figure 3:
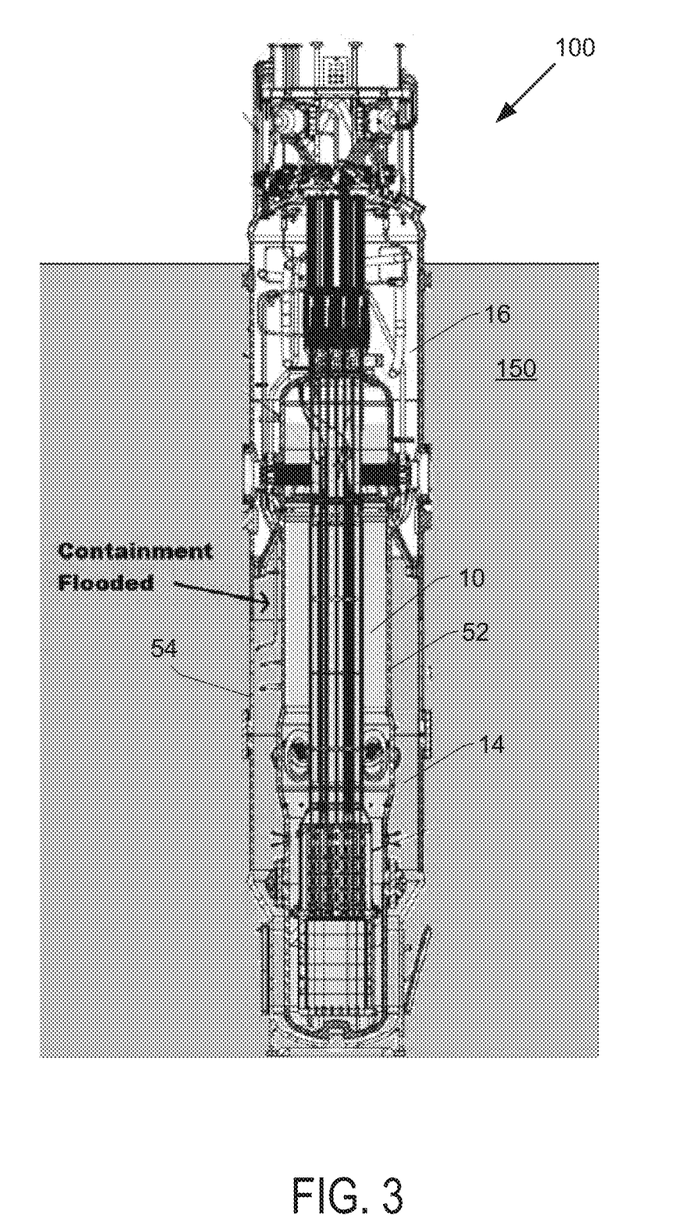
FIG. 3 illustrates the example nuclear reactor module of FIG. 1, with a flooded containment region.

FIG. 3 illustrates the example nuclear reactor module 100 of FIG. 1, with a flooded or at least partially flooded containment region 14. During a normal, non-emergency shutdown, one or more steam generators may be configured to release steam and cool down the reactor module 100 from normal operating temperatures down to about 250° F. (121° C.). However, as the process of releasing steam may become somewhat ineffective at 250° F., the temperature of the reactor module may become essentially static or fixed the closer that it gets to the boiling temperature of the secondary coolant.

The cool-down process may be augmented by at least partially flooding the containment region 14 of the example reactor module 100. In some examples, the containment region 14 may be flooded with borated water from the reactor pool 150 until the level of the water is at or above the height of pressurizer baffle plate 45 (FIG. 2). During the cool-down process, water that enters containment region 14 is kept outside of reactor pressure vessel 52 and, similarly, all of the primary coolant 10 is kept within reactor pressure vessel 52.

The upper head of the reactor pressure vessel 52 may be kept above the level of the water to avoid any connections that may pass through the upper head from being submerged in or otherwise exposed to water. In some examples, the predetermined level of the water within the containment region 14 may be associated with flooding the containment region 14 so that the majority of the reactor pressure vessel 52 is surrounded by the water. In other examples, the entire reactor pressure vessel 52 may be surrounded or submerged in the water that floods the containment region 14.

The containment region 14 may be at least partially filled with water to initiate a passive cool-down process to a cold shutdown state, e.g., a shutdown state associated with primary coolant temperatures of less than 200° F. (93° C.). Once the containment region 14 is flooded above a predetermined level, no further action may be required, and the passive cool-down of the operating temperature to less than 200° F. may occur primarily as a function of natural circulation of the primary coolant 10 within the reactor pressure vessel 52, the shutdown reactor's decay heat, the transfer of heat from the primary coolant 10 to the water in the containment region 14, and the temperature of the reactor pool 150.

During the cool-down process, an upper portion 16 of the containment region 14 may remain substantially dry and/or above the surface of the water contained therein. The pressure within upper portion 16 may be equalized to approximate atmospheric conditions as the reactor module reaches the shutdown state. A manway and/or release valve may be provided in the upper portion 16 of the containment region 14 to vent gases to atmosphere. In some examples, the manway and/or one or more valves may be configured to provide access to the containment region 14 for purposes of adding water. The pressure in the upper portion 16 may be controlled in order to maintain the level of water within the containment region 14 to a predetermined height within containment vessel 54.

In examples where the reactor module 100 is configured to operate without any conventional thermal insulation being applied to the exterior of the reactor pressure vessel 52, heat may be readily transferred through the reactor vessel wall to the surrounding water in the containment region 14 during the cool-down process.

Figure 4:
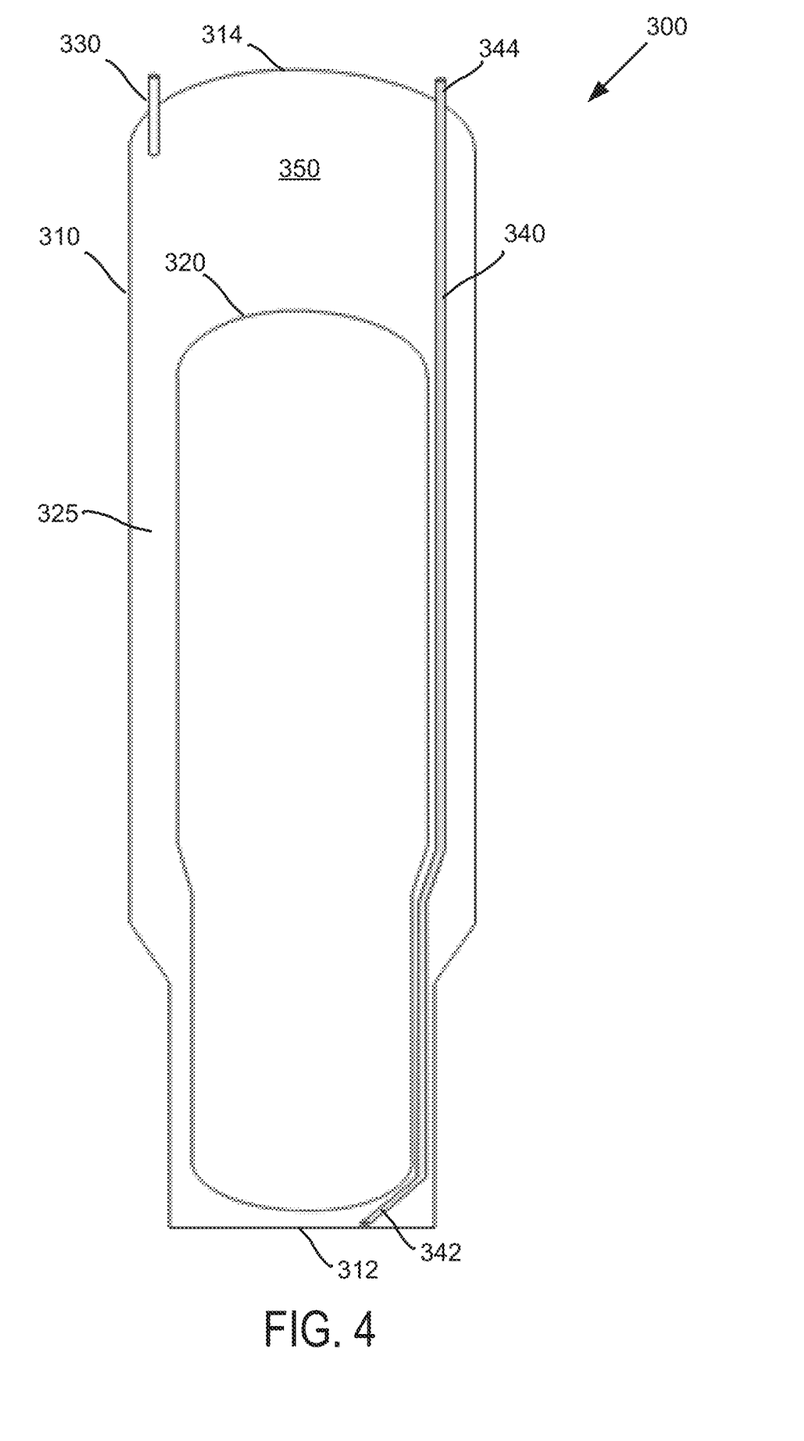
FIG. 4 illustrates an example containment flooding system.

FIG. 4 illustrates an example containment flooding system 300. A containment vessel 310 may comprise a lower vessel head 312 and/or an upper vessel head 314. In some examples, lower vessel head 312 may contain a sump. Containment flooding system 300 may comprise a fill pipe 340, including a lower end 342 located at or near the bottom of lower vessel head 312 and/or in the sump. Additionally, fill pipe 340 may comprise an upper end 344 located at or near upper vessel head 314. In some examples, the upper end 344 of fill pipe 340 may penetrate through the upper vessel head 314 of containment vessel 310. One or both of lower end 342 and upper end 344 of fill pipe 340 may be configured to control the flow of liquid into or out of containment vessel 310.

The example containment vessel flooding system 300 may comprise a containment flood and drain system (CFDS). In some examples, fill pipe 340 may also operate and/or be configured to function as a drain pipe. For example, the containment vessel flooding system 300 may be configured to drain liquid from the containment vessel 310 prior to normal or full-power operation of the reactor module.

A vent 330 may be configured to transfer air and/or gas into or out of a containment region 350 that at least partially surrounds a reactor pressure vessel 320. Vent 330 may couple containment vessel 310 with an air compressor or other type of gas compression device that may be configured to force the air and/or gas into containment vessel 310. Air and/or gas released into containment vessel 310 may operate to increase the initial pressure associated with containment region 350, such as during a containment drain operation. In other examples, vent 330 may be configured to release air and/or gas out of containment vessel 310 during a containment flooding operation, in order to maintain pressure within containment region 350 within a predetermined operating range and/or below an allowable pressure rating.

In the fully drained condition, e.g., during the normal or full-power operation of the reactor module, liquid may be completely or substantially completely removed from within containment region 350. Similarly, the entire outer surface of reactor vessel 320, including an annular region 325 located between reactor vessel 320 and containment vessel 310, may be substantially dry.

Vent 330 may be connected to a source of service air. In other examples, containment region 350 may be further evacuated of air and/or gas in order to create a vacuum or a partial vacuum that may substantially surround reactor vessel 320 when there is no liquid in containment region 350. A pump attached to vent 330, or some other system for removing the air and/or gas from containment region 350, may be configured to create the partial vacuum. In some examples, the evacuated containment region may be created after a refueling operation and before a reactor startup operation. Additionally, containment vessel flooding system 300 may be configured to release pressurized air and/or gas out of containment region 350 via vent 330.

Figure 5:
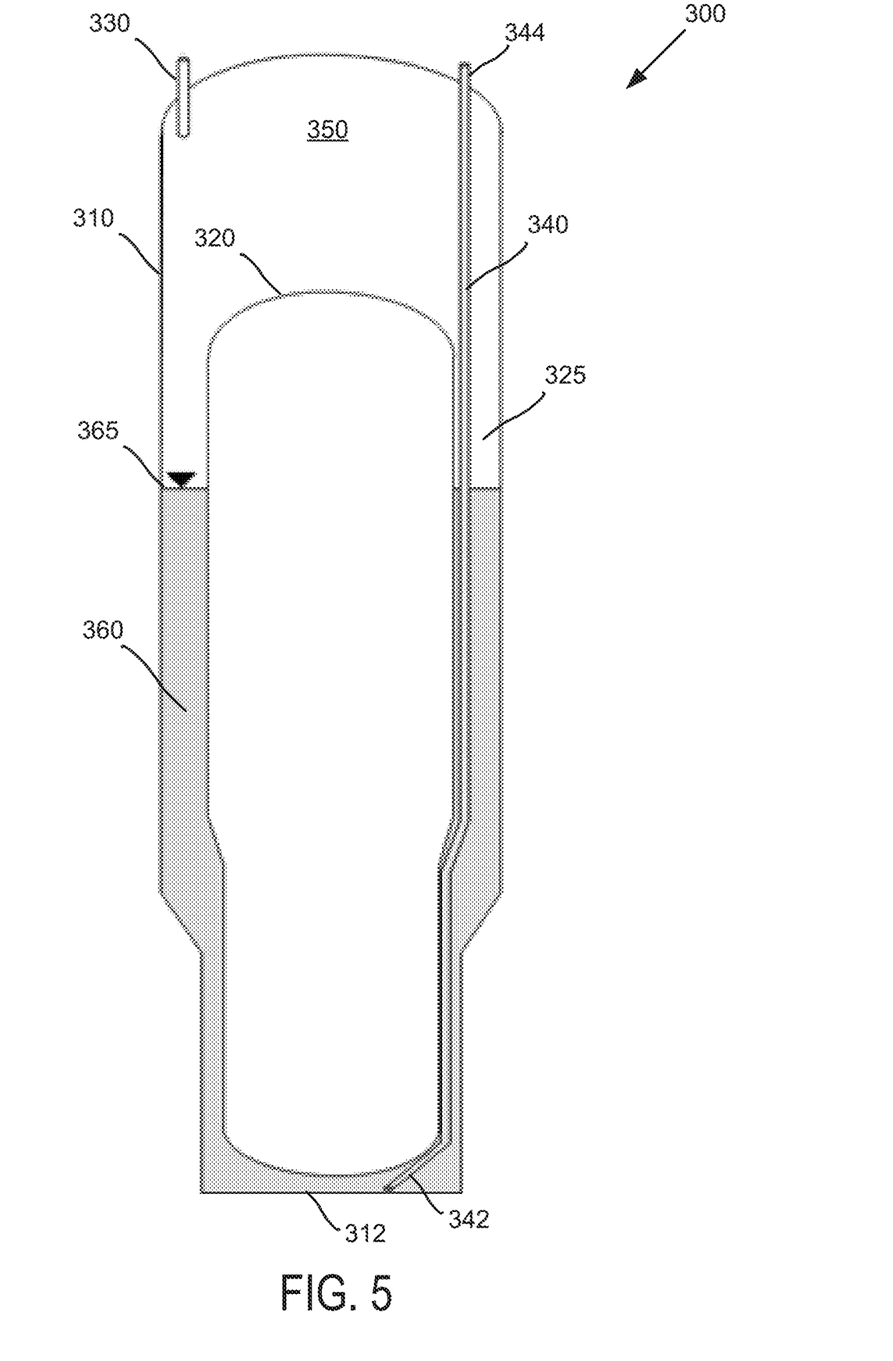
FIG. 5 illustrates the example containment vessel flooding system of FIG. 4 in a filled condition.

FIG. 5 illustrates the example containment vessel flooding system 300 of FIG. 4 in a filled or partially filled condition. In the filled condition, a liquid 360 may be understood as initially filling the lower vessel head 312, and then proceeding to an elevation 365. Liquid 360 from a source located external to the containment vessel 310 may enter into the upper end 344 of fill pipe 340 and at least partially fill containment region 350 via the lower end 344 of fill pipe 340. In some examples, the pressure within containment region 350 may increase in response to the liquid 360 entering the containment vessel 310, as the elevation 365 of liquid 360 rises up from the bottom of lower vessel head 312. In other examples, pressure within containment region 350 may be controllably released out of vent 330.

Liquid 360 may at least partially surround reactor vessel 320 about the annular region 325. Containment region 350 may be associated with a fill pressure while the surface of liquid 360 is at elevation 365 within the annular region 325. The fill pressure of containment region 350 may operate to maintain the height of liquid 360 at elevation 365. For example, the pressure within containment region 350 may reach a fill pressure that operates to equilibrate the fluid pressure associate with the incoming liquid 360, so that the flow of liquid 360 into containment vessel 310 effectively stops. In other examples, the flow of liquid 360 into containment vessel 310 may equal a flow of liquid 360 out of containment vessel 310 when the fill pressure within containment region 350 has been reached.

Elevation 365 may be maintained at approximately the same height as the reactor pressure vessel baffle plate 45 (FIG. 2). Elevation 365 may be greater than 50 feet. In some examples elevation 365 may be somewhere between 70 and 100 feet. In still other examples, elevation 365 may be less than 70 feet or greater than 100 feet.

Figure 6:
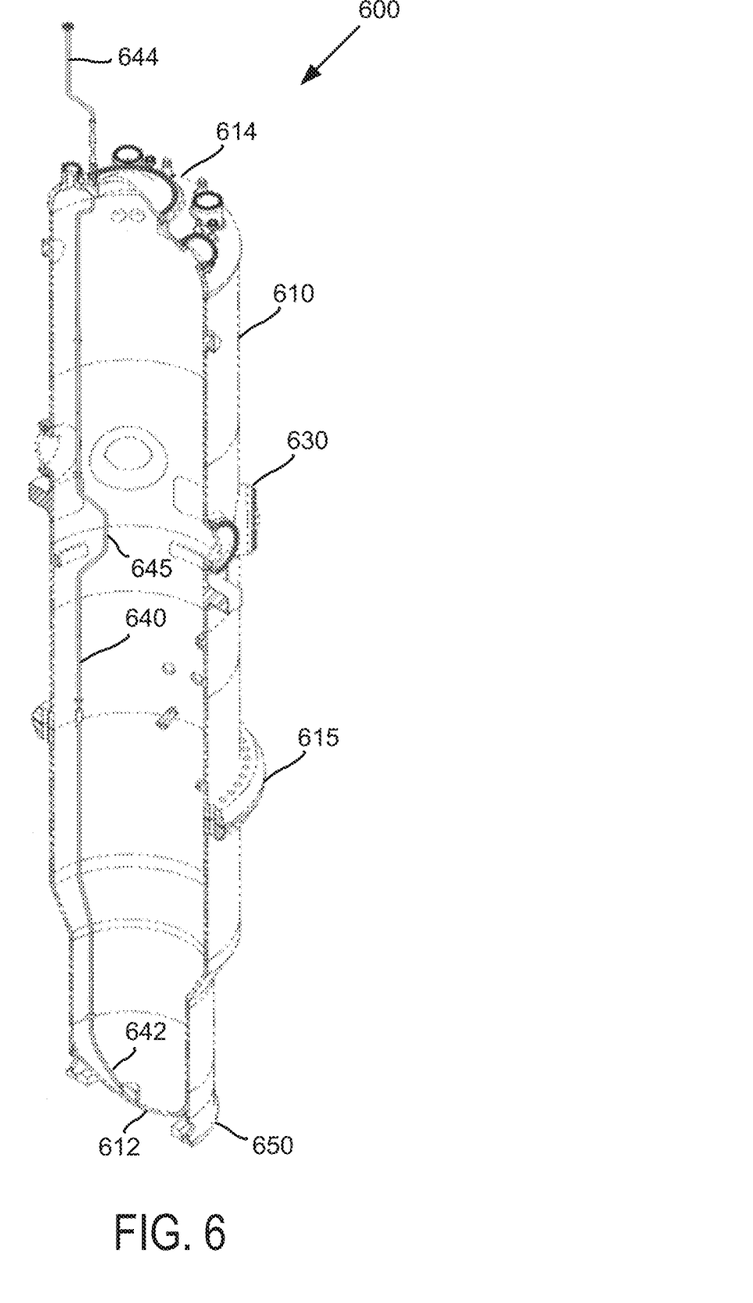
FIG. 6 illustrates an example containment fill system for a reactor module.

FIG. 6 illustrates an example containment fill system 600 for a reactor module. The reactor module may comprise a containment vessel 610 including a lower head 612 and an upper head 614. In some examples, one or both of lower head 612 and upper head 614 may be removably attached to containment vessel 610, such as by a containment flange 615. Additionally, containment vessel 610 may comprise a base support 650 that is configured to support the weight of the reactor module on the floor, ground, and/or support surface of a containment building or reactor bay.

Containment fill system 600 may comprise a fill pipe 640 including a lower end 642 and an upper end 644. Similar to that described with respect to the fill pipe 340 of FIGS. 3 and 4, lower end 642 of fill pipe 640 may be located at or near the bottom of lower head 612. Additionally, upper end 644 of fill pipe 640 may be located at or near upper head 614. In some examples, the reactor module may not include any penetrations through the lower head 612 that could otherwise be used to drain any liquid contained within containment vessel 610. Rather, upper end 644 of fill pipe may penetrate and/or pass through the upper head 614.

Additionally, the containment module may comprise one more plenum 630 associated with a secondary cooling system. An intermediate portion 645 of fill pipe 640 may be configured to pass around one or more of the plenum 630 and/or a portion of secondary coolant tube bundles that may be contained within containment vessel 610. Containment vessel 610 may be configured to be flooded, at least partially, with liquid or water. In some examples, containment fill system 600 may be configured to remove the water from within containment vessel 610. However, the reactor module may be designed without any pumps being contained within containment vessel 610.

Figure 7:
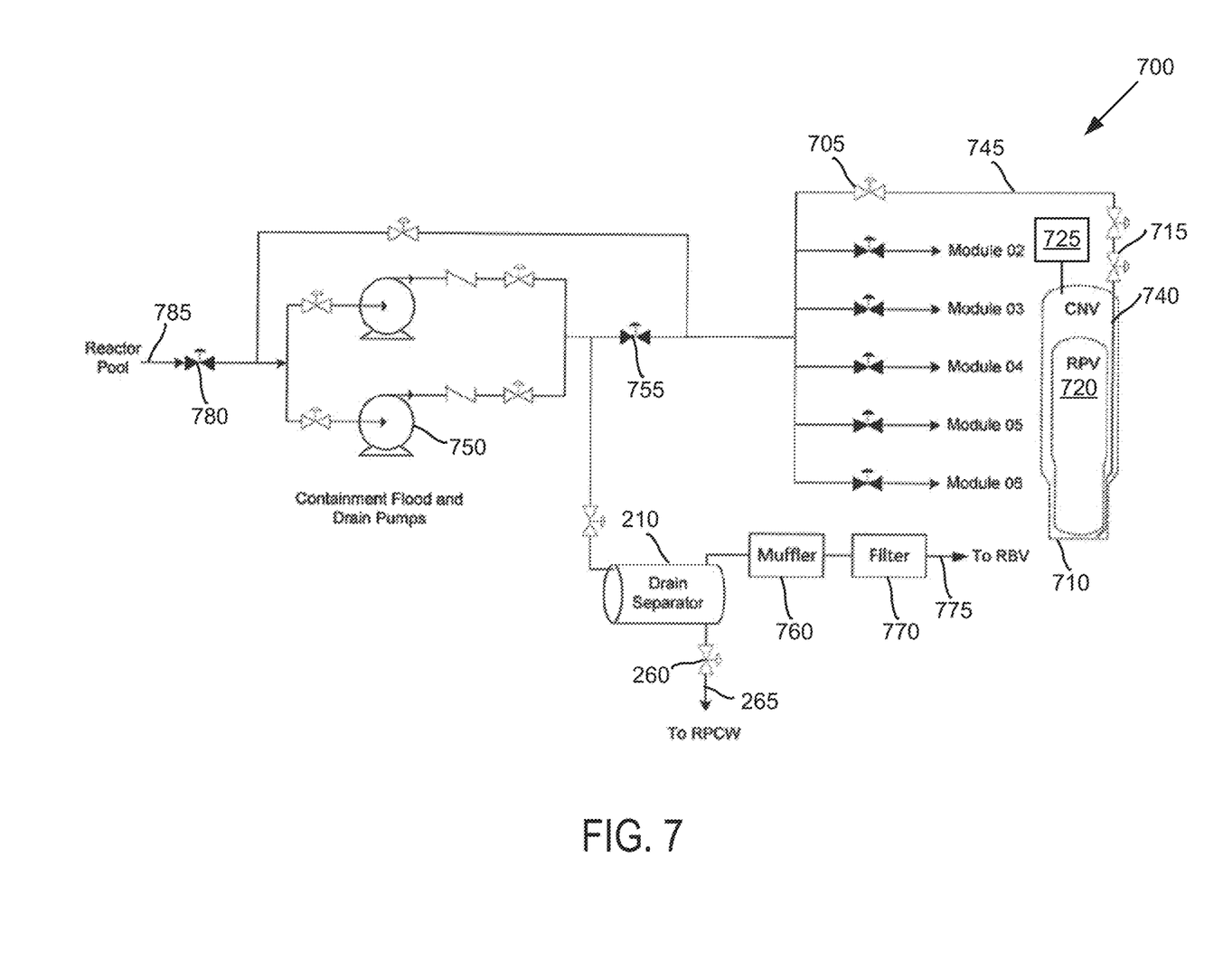
FIG. 7 illustrates a simplified fluid circuit for an example containment vessel fill system.

FIG. 7 illustrates a simplified fluid circuit for an example containment vessel fill system 700. Containment vessel fill system 700 may be configured to controllably provide liquid to a containment vessel 710. In some examples, containment vessel 710 may at least partially surround a reactor vessel 720 by a containment region, similar to one or more of the systems described at FIGS. 1-6. Additionally, a fill pipe 740 may be configured to provide liquid and/or release liquid from containment vessel 710.

Fill pipe 740 may be fluidly coupled to containment vessel 710 and may comprise a lower end located in a lower portion of containment vessel 710. One or more fill valves 715 may be configured to regulate, restrict, prohibit, limit, or otherwise control the flow of liquid and/or air in at least one direction through the fluid circuit. A fill line 745 and one or more fill line valves 705 may fluidly connect fill pipe 740 to one or more pumps 750. The one or more pumps 750 may be configured to provide a suction force that transfers liquid to, and in some examples from, containment vessel 710 via fill pipe 740.

The one or more pumps 750 may be located outside of containment vessel 710. Additionally, the one or more pumps 750 may be configured to draw water from a cooling pool 785 located outside of containment vessel 710. The liquid that fills containment vessel 710 may comprise water drawn from the cooling pool 785. In some examples, the liquid may be added to, or removed from, the containment vessel 710 at a flow rate of approximately 100 gallons per minute.

Additionally, fill line 745 may operate to fluidly connect fill pipe 740 to a fluid separation system including a fluid separation container 210 and/or a fluid level control device 260. Fluid separation container 210 may be located outside of containment vessel 710. The fluid separation system may be configured to separate liquid from a gaseous volume, such as when the containment vessel 710 is drained.

Fill line valves 705 may be interconnected to allow liquid to be selectively provided to a plurality of reactor modules operatively connected to the containment vessel fill system 700. Accordingly, pumps 750 may be configured to operate as one or more shared system components for the plurality of reactor modules. In some examples, six or more reactor modules may be connected to the fluid circuit and/or to one or more of the shared components.

Additionally, containment vessel fill system 700 may comprise one or more venting systems 725. Venting system 725 may be operatively coupled to containment vessel 710, and may comprise a vent located in an upper portion of containment vessel 710. Air and/or gas may be released from, or added to, the containment vessel 710 via venting system 725 in combination with, or preceded by, the introduction of liquid through fill pipe 740. The air and/or gas may form a gaseous volume that is used to control the volume of liquid in containment vessel 710. The gaseous volume may form a pressurized region above the surface of the liquid, and the pressurized region may operate to apply a surface pressure on the liquid.

In some examples, liquid may be transferred from containment vessel 710 to fluid separation tank 210 when the containment vessel 710 is drained. Depending on the size of containment vessel 710 and/or the amount of liquid contained therein, it may take several hours to clear the liquid from containment vessel 710. Fluid separation tank 210 may comprise one or more noise dampers, noise filters, particulate filters, noise silencers, and/or noise diffusers, such as a muffler 760 and/or a filter 770, connected to fluid separation tank 210. Muffler 760 and/or filter 770 may be configured to reduce the decibel level, reduce radioactive particulates associated with the released air, and/or otherwise mitigate or diminish the acoustic effects of the released air and/or gas while controlling the depressurization of containment vessel 710 during a draining operation.

One or more of the fluid separation tank 210, muffler 760 and/or filter 770 may be combined with a Containment Evacuation System (CES), a Reactor Pool Cooling System (RPCS) or a Heating, Ventilation and Air Conditioning (HVAC) system associated with a reactor module and/or a reactor building.

Liquid that is removed from containment vessel 710 may be discharged into a relatively large holding tank or into cooling pool 785. A cooling tank valve 780 may be configured to regulate, restrict, prohibit, limit, or otherwise control the flow of liquid and/or air in one or more directions through the fluid circuit.

One or more circuit valves 755 may be configured to selectively regulate, restrict, prohibit, limit, or otherwise control the direction of flow of liquid and/or air through the circuit.

In some examples, the one or more circuit valves 755 may be configured to allow water pumped from cooling pool 785 to be transferred into containment vessel 710. Additionally, the one or more circuit valves 755 may be configured to allow water and/or air housed in containment vessel 710 to be transferred to the separation tank 210.

Water that is transferred to fluid separation tank 210 may be discharged or released into a relatively large holding tank 265 and/or a water cleanup system, depending on the containment water quality and/or temperature. Once cleaner and/or cooled, the water may be returned to the cooling pool 785. In some examples, holding tank 265 and cooling pool 785 may comprise the same body of water and/or be fluidly connected to each other. In other examples, one or both of the holding tank 265 and cooling pool 785 may comprise a suppression pool.

Figure 8:
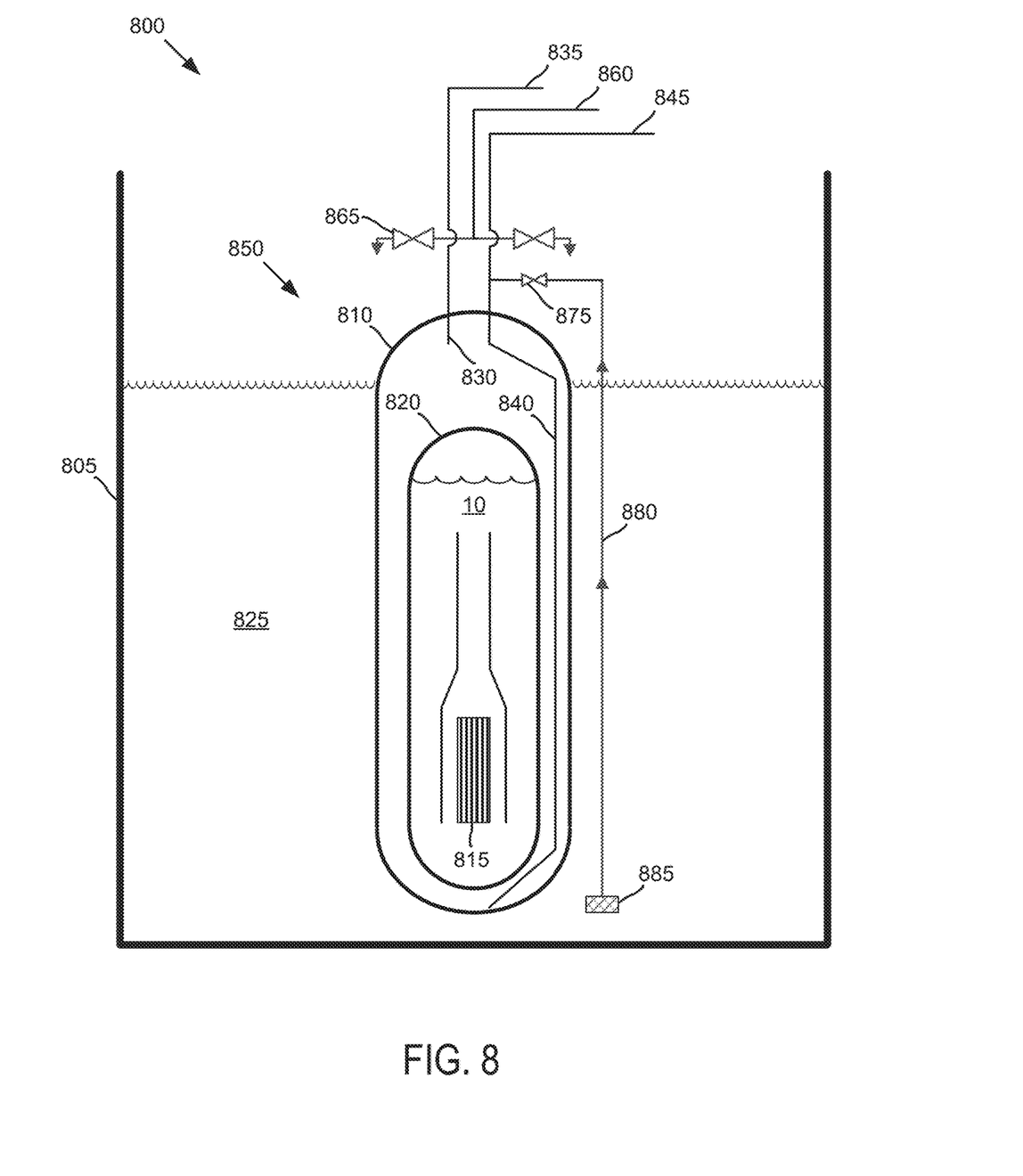
FIG. 8 illustrates an example containment fill system for a reactor module at least partially submerged in a pool of water.

FIG. 8 illustrates an example containment fill system 800 for a reactor module 850 at least partially submerged in a pool of water 825. The pool of water 825 may be contained in a reactor building 805 and/or a reactor bay that houses reactor module 850. In some examples, the pool of water 825 and/or reactor module 850 may be located below ground level. Reactor module 850 may comprise a containment vessel 810 and a reactor vessel 820 housed within the containment vessel 810. One or both of containment vessel 810 and reactor vessel 820 may be manufactured out of metal, such as steel or a steel alloy. The walls of reactor building 805 may include steel-reinforced concrete.

Fill pipe 840 and/or one or more other devices or systems connected to fill pipe 840 via a hydraulic line 845 may be configured to fill containment vessel 810 with a liquid. For example, hydraulic line 845 may be configured to operatively connect fill pipe 840 to one or more pumps, such as pump 750 of FIG. 7.

An inlet 855 located within the pool of water 825, together with hydraulic line 880 and one or more valves, such as valve 875, may be configured to provide liquid to at least partially flood the containment vessel 810. Valve 875 may comprise a one-way valve which can be opened to draw in water through inlet 885. Additionally, hydraulic line 880 may be connected to fill pipe 840, such that water drawn into inlet 885 may be released into containment vessel 810.

One or more pumps and/or holding tanks may be configured to provide the water or other type of liquid that is released into the containment vessel 810. The liquid that is drawn from the pool of water 825 through inlet 885 and used to flood containment vessel 810 may be discharged by one or more discharge devices 865 located in the pool of water during a draining operation.

A vent 830 and/or one or more other devices or systems connected to vent 830 via a hydraulic line 835 may be configured to remove a pressurized gas from containment vessel 810 and/or to provide a pressurized gas to containment vessel 810. Additionally, vent 830 and/or hydraulic line 835 may be operatively connected to an air evacuation system.

Hydraulic line 860, hydraulic line 880, inlet 885, one or more valves 875, and/or discharge devices 865 may comprise components of a system for providing an auxiliary source of water to a secondary coolant system. In some examples, all of the functionality described for the apparatus and systems disclosed herein may be performed without any of the primary coolant 10 being allowed to leave reactor vessel 820.

Figure 9:
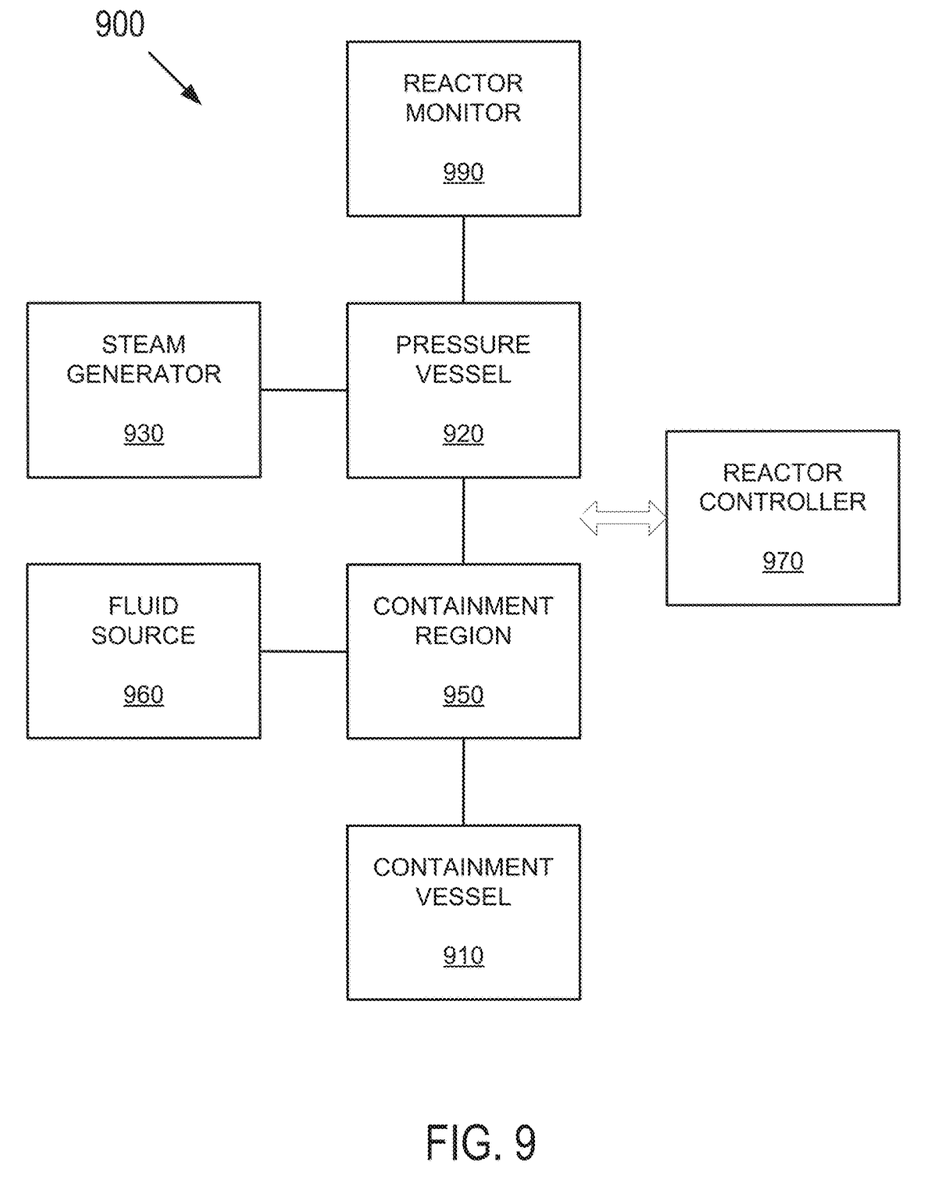
FIG. 9 illustrates an example cooling system for a reactor module.

FIG. 9 illustrates an example cooling system 900 for a reactor module comprising a reactor pressure vessel 920 housing primary coolant. A steam generator 930 may be configured to lower a temperature of the reactor pressure vessel 920 by transferring heat from the primary coolant to a secondary coolant that circulates through the steam generator 930.

Cooling system 900 may further comprise a containment vessel 910 that at least partially surrounds the reactor vessel in a containment region 950. Containment region 950 may be maintained in a substantially dry condition during normal operation of the reactor module, for example during full power generation. In some examples, the containment region 950 may be at least partially evacuated of any liquid and/or gas during the normal operation of the reactor module.

A controller 970 may be configured to introduce a source of fluid 960 into the containment region 950 in response to a non-emergency shut down of the reactor module. The source of fluid 960 may be located external to containment vessel 910 and, in some examples, the fluid may be introduced into the containment region 950 after the steam generator 930 has initially lowered the temperature of the reactor pressure vessel 910 by releasing the secondary coolant as steam.

Additionally, a reactor monitor 990 may be configured to monitor the temperature of the reactor pressure vessel 920 and/or the primary coolant contained within reactor pressure vessel 920. Reactor monitor 990 may comprise a sensor, a gauge, a thermometer, a thermocouple, other means of monitoring temperature, or any combination thereof. Additionally, reactor monitor 990 may be configured to monitor, measure, detect, read, sense, estimate, or otherwise determine the temperature associated with the reactor pressure vessel. In some examples, the temperature associated with the reactor pressure vessel 920 may be indirectly determined based on the pressure within the reactor pressure vessel 920, a flow rate of the primary coolant contained within the reactor pressure vessel 920, other operating conditions associated with the reactor module, or any combination thereof.

Controller 970 may be configured to introduce water into the containment region 950 in response to the reactor monitor 990 determining that the temperature associated with the reactor pressure vessel 920 has reached a threshold cooling temperature. The threshold cooling temperature may be greater than the boiling temperature of the secondary coolant. In some examples, the threshold cooling temperature may be approximately 250 degrees Fahrenheit.

The source of fluid 960 may comprise a reactor bay pool, and the containment vessel 910 may be at least partially submerged in the reactor bay pool. The introduction of water into the containment region 950 may operate to lower the temperature associated with the reactor pressure vessel 920 to fall below the boiling temperature of the secondary coolant.

The water may at least partially fill containment region 950 to a fill line such that the majority of the reactor pressure vessel 920 may be submerged in the water below the fill line. Additionally, a pressure within the containment vessel 910 may increase in response to the introduction of water into the containment region 950. In some example, the height of the water within the containment region 950 may be maintained at approximately the fill line as the pressure equilibrates within the containment vessel 910.

During both the release of steam from steam generator 930 and the introduction of water into containment region 950, all of the primary coolant of the reactor module may remain contained within reactor pressure vessel 920, such that the primary coolant is not allowed to fluidly mix with either the secondary coolant that circulates through the steam generator 930 or to mix with the water that is introduced into the containment region 950. Similarly, the secondary coolant may remain fluidly isolated from the water that is introduced into the containment region 950. Accordingly, in some examples, during the cool-down operation the primary coolant, the primary coolant, and the external water source are not allowed to fluidly intermix with each other.

Figure 10:
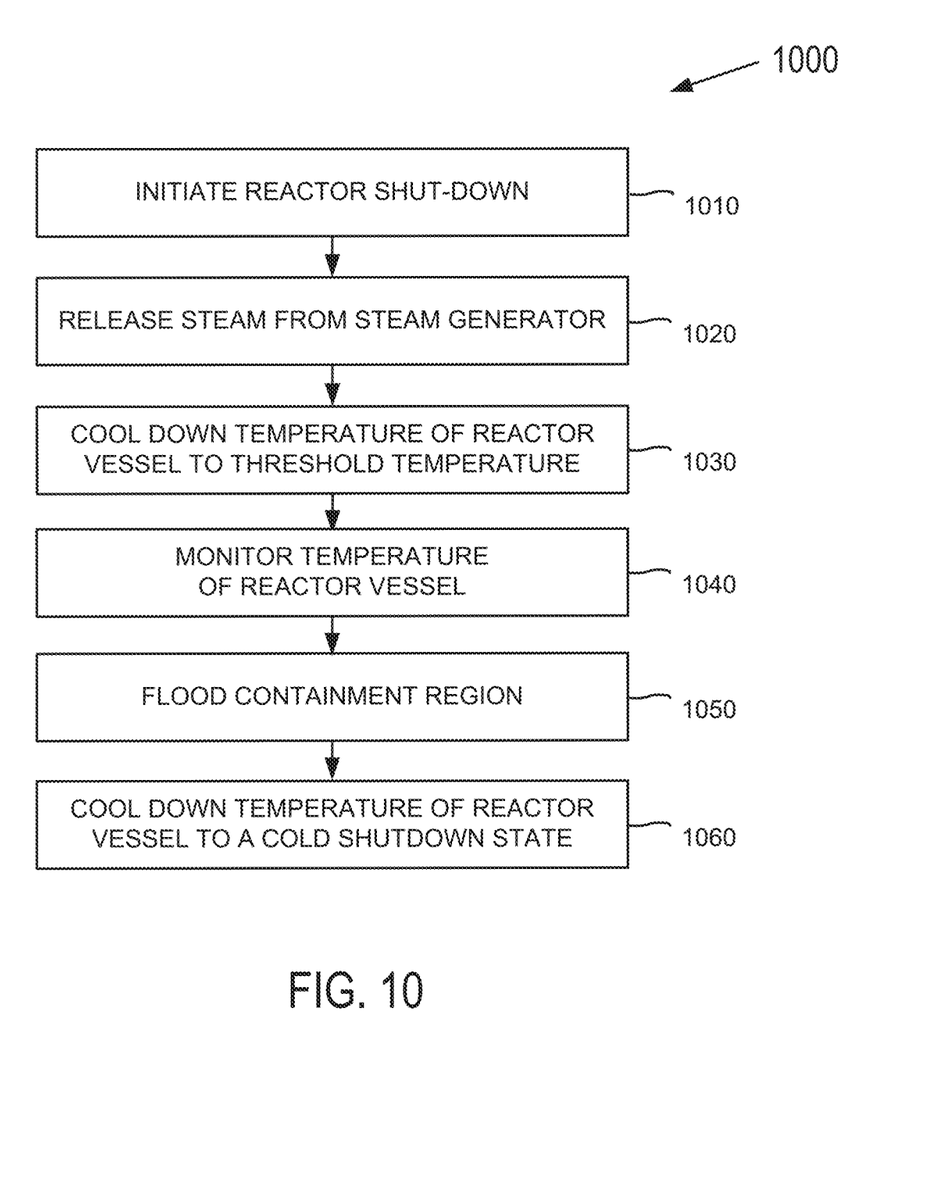
FIG. 10 illustrates an example process of passively cooling down a reactor module to a cold shutdown state.

FIG. 10 illustrates an example process 1000 of passively cooling down a reactor module to a cold shutdown state. The reactor module may comprise a reactor vessel housed within a containment vessel. The containment vessel may at least partially surround the reactor pressure vessel by a containment region. The containment region may be evacuated of liquid and/or air during normal operation of the reactor module. Additionally, the containment vessel may be at least partially submerged in a reactor pool.

At operation 1010, a reactor shut-down may be initiated. In some examples, the reactor shut-down may be initiated by inserted a plurality of control rods into a reactor core. The reactor shut-down may be associated with a non-emergency operation, such as preparing the reactor module for refueling or for routine maintenance. The control rods may be configured to reduce or eliminate the number of fission events occurring in a reactor core which would otherwise release heat into the surrounding primary coolant.

At operation 1020, heat transferred from the primary coolant to a secondary cooling system causes the secondary coolant to turn into steam, and the steam may be released from one or more steam generators. The release of the steam may operate to reduce the temperature of the primary coolant as additional heat is continuously transferred to the secondary coolant system.

At operation 1030, the temperature of the reactor pressure vessel (e.g., the temperature of the primary coolant) may be cooled down to a threshold temperature. The threshold temperature may be associated with a relatively static temperature of the reactor pressure vessel that may be achieved in response to releasing the steam. The threshold cool-down temperature may be greater than the boiling temperature of the secondary coolant, for example the threshold cool-down temperature may be approximately 250°. In some examples, the threshold cool-down temperature may be approximately equal to the boiling temperature of the secondary coolant.

Process 1000 may comprise monitoring the temperature of the reactor pressure vessel at operation 1040. The containment region may be at least partially flooded in response to determining when the threshold cool-down temperature has been achieved. The temperature of the reactor pressure vessel may initially be brought to the threshold temperature before initiating any further cooling systems, such as described at operation 1050, to avoid and/or mitigate any thermal stress, metal fatigue, or system shock that might otherwise occur if the temperature of the reactor module decreased too rapidly.

At operation 1050, in response to cooling down the reactor pressure vessel to the threshold temperature, or in anticipation thereof, the containment region surrounding the reactor pressure vessel may be at least partially flooded. In some examples, the containment region may be partially flooded with water stored in the reactor pool. Heat from the primary coolant may be transferred via conduction through the wall of the reactor pressure vessel and into the water that floods the containment region. The primary coolant may not be allowed to fluidly intermix with the water from the reactor pool and/or from water in the containment region; rather, the primary coolant may remain completely retained within the reactor pressure vessel at all times during the cool-down process.

The fluid may at least partially fill the containment region to a fill line such that the majority of the reactor pressure vessel is submerged in the fluid below the fill line. In some examples, process 1000 may comprise increasing a pressure within the containment vessel in response to partially flooding the containment region, and reaching an equilibrium pressure within the containment vessel. The height of the fluid within the containment region may be maintained at approximately the fill line as the pressure equilibrates within the containment vessel.

Additionally, process 1000 may comprise restricting a flow of the fluid from the external fluid source into the containment region in response to reaching the equilibrium pressure, and/or releasing at least a portion of the fluid from the containment region in response to reaching the equilibrium pressure. For example, a flow rate of the released fluid may be approximately equal to a flow rate associated with partially flooding the containment region to maintain the height of the water within the containment region at approximately the fill line.

At operation 1060, the temperature associated with the reactor pressure vessel may be cooled down via the transfer of heat into the flooded containment region until a cold shutdown state is achieved. In some examples, the cold shutdown state may be associated with a reactor pressure vessel temperature and/or primary coolant temperature of approximately 200° F.

The cold shutdown state of the reactor module may be maintained by keeping the containment region flooded. In some examples, water located in the containment region may be replaced from an additional water source, such as the surrounding reactor pool. The water may be replaced via natural circulation, e.g., due to a difference in density and/or temperature of the water at different elevations within the reactor pool. An equilibrium pressure within the containment region may be maintained until the reactor module reaches the cold shutdown state.

The cool-down process may be initiated and/or continue to operate without any pumps or electrical power, including the situation in which a complete loss of plant power may be experienced. The cool-down process may continue to operate and function to maintain the reactor module at or below temperatures associated with the cold shutdown state. Additionally, the reactor module may be moved within the reactor pool, e.g., by an overhead crane, while still maintaining the cold shutdown state of the reactor due at least in part to the presence of water in the containment region to facilitate the cool-down process.

Whereas various examples described herein have provided for the source of water to flood the containment region as coming from a reactor pool, in still other examples, the source of water may comprise a radioactive waste system, a Chemical and Volume Control System (CVCS), the Emergency Core Cooling System (ECCS), an auxiliary tank of water, a body of water, or any combination thereof.

One or more example systems described herein may comprise various nuclear reactor technologies, and may comprise and/or be used in conjunction with nuclear reactors that employ uranium oxides, uranium hydrides, uranium nitrides, uranium carbides, mixed oxides, and/or other types of fuel. Although the examples provided herein have primarily described a pressurized water reactor and/or a light water reactor, it should be apparent to one skilled in the art that the examples may be applied to other types of power systems. For example, the examples or variations thereof may also be made operable with a boiling water reactor, sodium liquid metal reactor, gas cooled reactor, pebble-bed reactor, and/or other types of reactor designs.

Additionally, the examples illustrated herein are not necessarily limited to any particular type of reactor cooling mechanism, nor to any particular type of fuel employed to produce heat within or associated with a nuclear reaction. Any rates and values described herein are provided by way of example only. Other rates and values may be determined through experimentation such as by construction of full scale or scaled models of a nuclear reactor system.

Having described and illustrated various examples herein, it should be apparent that other examples may be modified in arrangement and detail. We claim all modifications and variations coming within the spirit and scope of the following claims.

The invention claimed is:

1. A cooling system for a nuclear reactor module, comprising:
   a nuclear reactor pressure vessel that houses primary coolant;
   a steam generator configured to lower a temperature of the reactor pressure vessel by transferring heat from the primary coolant to a secondary coolant that circulates through the steam generator and releasing at least a portion of the secondary coolant as steam;
   a containment vessel at least partially surrounding the reactor pressure vessel, which forms a containment region therebetween, wherein the containment region is dry during normal operation of the nuclear reactor module;

a temperature monitor configured to monitor temperature of the pressure vessel;

at least one conduit that enables the containment region to receive water from a source of water; and a controller in operative connection with the temperature monitor, wherein the controller is configured to cause a non-emergency shut down of the nuclear reactor module, including:

causing, during the non-emergency shut down, the steam generator to release steam to lower the temperature of the reactor pressure vessel, and causing, during the non-emergency shut down, water from the source of water to be introduced into the containment region through at least one conduit in response to a determination that the temperature of the reactor pressure vessel indicated by the temperature monitor has been lowered to a threshold cooling temperature as a result of the steam release.

2. The cooling system of claim 1, wherein the containment vessel is at least partially submerged in a reactor bay pool and at least one conduit receives water from the reactor bay pool.

3. The cooling system of claim 1, wherein the threshold cooling temperature is above a boiling temperature of the secondary coolant, and wherein the introduction of the water into the containment region operates to lower the temperature of the reactor pressure vessel to below the boiling temperature of the secondary coolant.

4. The cooling system of claim 3, wherein the threshold cooling temperature is approximately 250 degrees Fahrenheit.

5. The cooling system of claim 1, wherein the containment vessel retains at least some of the water introduced into the containment region through at least one conduit and submerges a majority of the reactor pressure vessel.

6. The cooling system of claim 5, wherein the containment vessel is configured to increase an internal pressure in response to the introduction of water into the containment region, and maintain the water within the containment region as the pressure equilibrates within the containment vessel.

7. A cooling system for a nuclear reactor module, the nuclear reactor module including a nuclear reactor pressure vessel that houses primary coolant, a steam generator configured to lower a temperature of the reactor pressure vessel by transferring heat from the primary coolant to a secondary coolant that circulates through the steam generator and releasing at least a portion of the secondary coolant as steam, and a containment vessel at least partially surrounding the reactor pressure vessel, which forms a containment region therebetween, wherein the containment region is dry during normal operation of the nuclear reactor module, the cooling system comprising:

a temperature monitor configured to monitor temperature of the pressure vessel;

a fill pipe that enables the containment region to receive water; and a controller in operative connection with the temperature monitor, wherein the controller is configured to:

cause a non-emergency shut down of the nuclear reactor module, cause, during the non-emergency shut down, the steam generator to release steam to lower the temperature of the reactor pressure vessel, and cause, during the non-emergency shut down, water to be introduced into the containment region through the fill pipe in response to a determination that the temperature of the reactor pressure vessel indicated by the temperature monitor has been lowered to a threshold cooling temperature as a result of the steam release.

8. The cooling system of claim 7, wherein the fill pipe receives water from a reactor bay pool that at least partially retains the containment vessel.

9. The cooling system of claim 7, wherein the controller introduces the water into the containment region to lower the temperature of the reactor pressure vessel to below the boiling temperature of the secondary coolant.

10. The cooling system of claim 7, wherein the threshold cooling temperature is approximately 250 degrees Fahrenheit.

11. The cooling system of claim 7, wherein the controller is configured to fill the containment region with water to submerge a majority of the reactor pressure vessel.

12. The cooling system of claim 7, wherein the controller is configured to maintain the water within the containment region as pressure equilibrates within the containment vessel.

* * * * *